(12) United States Patent
Dumas et al.

(10) Patent No.: US 11,047,255 B2
(45) Date of Patent: Jun. 29, 2021

(54) CONTROL DEVICE OF AN ANNULAR ROW OF VARIABLE-PITCH VANES FOR AN AIRCRAFT ENGINE

(71) Applicant: SAFRAN AIRCRAFT ENGINES, Paris (FR)

(72) Inventors: Lilian Yann Dumas, Moissy-Cramayel (FR); Cédric Michel Claude Chretien, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 23 days.

(21) Appl. No.: 16/374,216

(22) Filed: Apr. 3, 2019

(65) Prior Publication Data
US 2019/0309649 A1 Oct. 10, 2019

(30) Foreign Application Priority Data

Apr. 6, 2018 (FR) ........................................ 1853033

(51) Int. Cl.
*F01D 17/16* (2006.01)
*F01D 9/04* (2006.01)

(52) U.S. Cl.
CPC ............ *F01D 17/162* (2013.01); *F01D 9/041* (2013.01); *F05D 2240/128* (2013.01); *F05D 2260/30* (2013.01); *F05D 2260/50* (2013.01)

(58) Field of Classification Search
CPC .......... F02C 9/22; F01D 17/16; F01D 17/162; F01D 17/165; F01D 17/167; F01D 17/12; F01D 17/14
See application file for complete search history.

(56) References Cited

U.S. PATENT DOCUMENTS

| 2,648,195 A | * | 8/1953 | Wilde | F01D 17/143 60/794 |
| 3,025,668 A | * | 3/1962 | Mock | F01D 17/14 60/39.24 |
| 3,066,488 A | * | 12/1962 | Mock | F01D 17/162 60/795 |

(Continued)

FOREIGN PATENT DOCUMENTS

| EP | 2053203 A1 | 4/2009 |
| FR | 3031772 A1 | 7/2016 |
| FR | 3038666 A1 | 1/2017 |

OTHER PUBLICATIONS

Rapport de Recherche Préliminaire dated Nov. 12, 2018, issued in corresponding French Application No. 1853033 filed Apr. 6, 2018, 2 pages.

*Primary Examiner* — David E Sosnowski
*Assistant Examiner* — Wesley Le Fisher
(74) *Attorney, Agent, or Firm* — Christensen O'Connor Johnson Kindness PLLC

(57) ABSTRACT

The present disclosure relates to a control device of an annular row of variable-pitch vanes for an aircraft engine. The device may include an annular row of actuating levers which each may include a first end attached to a pivot of one of the vanes and a second end connected to a control ring in rotation about an axis of rotation. The control ring may include at least one annular series of articulated links, wherein the second end of each lever carries a pivot connection articulating two successive links of the annular series about a single axis, the single axis extending in a direction substantially parallel to the axis of rotation.

13 Claims, 1 Drawing Sheet

(56) References Cited

U.S. PATENT DOCUMENTS

| | | | | |
|---|---|---|---|---|
| 5,498,128 A | * | 3/1996 | Baets | F01D 17/165 |
| | | | | 415/164 |
| 5,518,365 A | * | 5/1996 | Baets | F01D 17/165 |
| | | | | 415/160 |
| 7,108,622 B2 | * | 9/2006 | Okabe | F16G 13/06 |
| | | | | 474/152 |
| 2009/0116954 A1 | | 5/2009 | Bouru et al. | |
| 2009/0301085 A1 | * | 12/2009 | Heyes | F01D 17/14 |
| | | | | 60/611 |
| 2014/0119896 A1 | * | 5/2014 | Koch | F01D 17/105 |
| | | | | 415/148 |
| 2018/0010478 A1 | | 1/2018 | Dumas et al. | |
| 2018/0371939 A1 | | 12/2018 | Bromann et al. | |

* cited by examiner

CONTROL DEVICE OF AN ANNULAR ROW OF VARIABLE-PITCH VANES FOR AN AIRCRAFT ENGINE

BACKGROUND

The angular pitch of the vanes in a stage of an engine type turbo-engine makes it possible to adapt the operation thereof to various engine speeds. For example, such a system makes it possible to discharge the high-pressure compressor according to the engine speed in order to prevent pumping in the compressor of a turbine engine.

In order to regulate operation according to a control law, it is important that the mechanism for controlling the pitch of each vane is precise and reliable. It is in particular desirable to limit the pitch errors linked to hystereses during the operation of the engine. These hystereses are in particular due to deformations of the parts of the control system.

A known control system comprises a rigid control ring which, by rotating about the axis of the engine, drives levers linked to the axes of the vanes for which it is desired to adjust the pitch.

In such a system, a significant portion of the hysteresis comes from the control ring. On the one hand, it appears that the latter is deformed due to the variations of temperatures which are substantial on the high-pressure body. A complete ring is dilated, thus modifying the clearances between the levers of the vanes and the casing. On the other hand, the ring can be deformed due to the forces of the kinematics of the system in the opening and closing phase of the vanes. Countering these effects results in increasing the size of the control ring and therefore the mass of the system.

SUMMARY

Embodiments of the present disclosure aim to propose a solution that makes it possible to ensure the precision following of the pitch law of the vanes according to the engine speed while still minimizing the parts in the pitch control system.

The present disclosure relates to embodiments of a control device of an annular row of variable-pitch vanes for an aircraft engine. The device in some embodiments includes an annular row of actuating levers which each comprise a first end intended to be attached to a pivot of one of the vanes and a second end intended to be connected to a control ring in rotation about an axis of rotation. The control ring includes at least one annular series of articulated links, characterised in that the second end of each lever carries a pivot connection articulating two successive links of the annular series about a single axis, the single axis extending in a direction substantially parallel to the axis of rotation.

In some embodiments, the pivot connection is along the single axis which is parallel to the axis of rotation of the ring. Additionally or alternatively, the pivot connection is connected to the second ends of the levers and rigidifies the series of links to form a ring in the radial plane, transverse to the axis and passing through the ends of the levers, while leaving a degree of freedom of deformation in this plane in order to absorb shape irregularities or deformations with respect to the circumference.

The device also comprises, in some embodiments, a second annular series of links and the second end of each lever carries a pivot connection articulating two successive links of the second annular series about the single axis.

The presence of two series of links of which two successive links are articulated by pivot connections about the same single axis for each second end of the lever confers more resistance to the structure of the ring for transmitting the forces and rotating the series of levers.

In some embodiments, the links of the first series and of the second series form pairs that connect each lever by being axially separated from one another and/or by being substantially parallel to one another. In additional or alternative embodiments, the links can be straight and/or formed by connecting rods, e.g., rods carrying at each end a hole allowing for the passage of a pivot. In some embodiments, the links are located on a circumference of which the diameter is greater than the diameter of a circumference passing through the second ends of the levers. In some embodiments, the second end of each lever is connected by a ball-joint connection to a finger that carries a pivot defining the single axis. The ball-joint connection may allow the lever to pivot along a radial axis with respect to the control ring and, furthermore, prevents the system from becoming hyperstatic, therefore difficult to adjust. In some embodiments, the finger is oriented along a substantially radial direction. In some embodiments, the pivot passes through the finger and comprises an end connected to two links extending on either side of the corresponding finger, and an opposite end connected to two links also extending on either side of this finger.

Embodiments of the present disclosure also relate to an aircraft engine, comprising at least one device such as described herein.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure.

Further, it will be appreciated that embodiments of the present disclosure may employ any combination of features described herein.

Embodiments of the present disclosure relate to aircraft engines that use variable-pitch vanes, more specifically to the control mechanism of an annular row of variable-pitch vanes.

Figure 1:
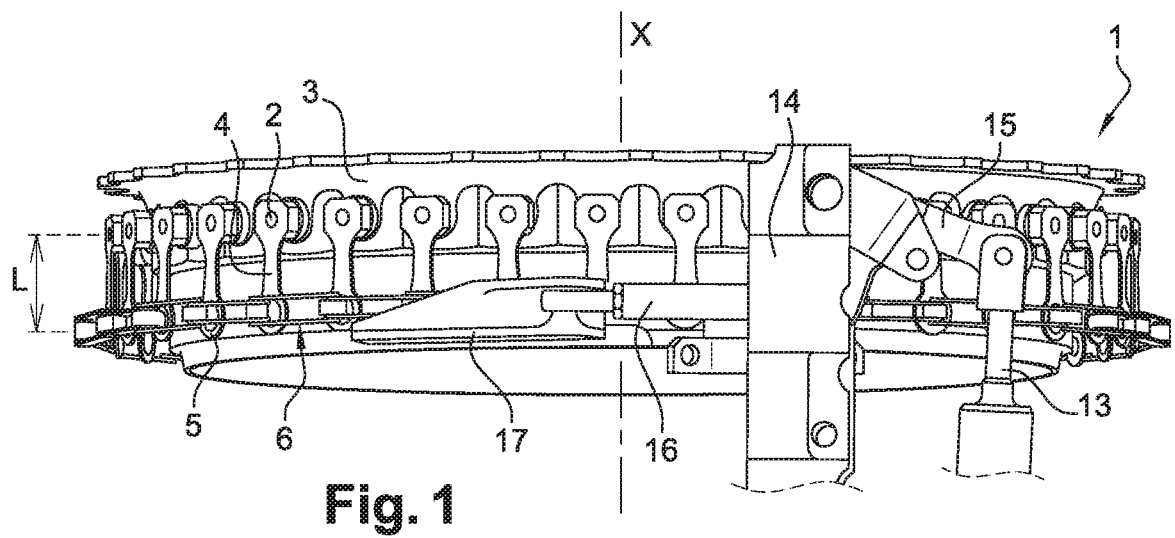
FIG. 1 shows a top view of a casing element carrying a device for controlling the pitch of vanes according to the present disclosure.

FIG. 1 shows a casing ring 1 supporting an annular row of variable-pitch vanes, equipped with a control device according to the present disclosure. The unit is shown without the vanes and independently of the rest of the turbine engine. Only pivots 2 of the vanes, having axes of rotation substantially radial with respect to the central axis X of the ring 1 and passing through a casing 3, are shown. It is, here, intended to be placed at the input of a high-pressure compressor in order to control the operation thereof. The pivots 2 of the vanes are here regularly spaced along the circumferential direction.

The control device here comprises, for each vane of the angular row, a lever 4 mounted integral with the pivot 2 of the vane, on the radially external wall of the casing 3. Driving the lever 4 in rotation about the axis R of the pivot 2 therefore makes it possible to adjust the pitch of the vane.

In the example shown, the levers 4 are regularly spaced along the circumferential direction, all identical and positioned such that the arms thereof are substantially parallel to the axis X of the casing for an average pitch value of the vanes about which it is sought to vary it. In this position, free ends 5 of the arms of the levers 4 are therefore located in a transverse plane, axially offset from the length L of the arms of the levers 4 with respect to the transverse plane where the pivots 2 of the annular row of vanes are positioned. It will be noted, that if the arms of the levers 4 rotate identically about the average position thereof, the axial position of the free ends 5 thereof varies slightly but these free ends 5 all remain in one same transverse plane.

The control device is here arranged to drive in an identical manner, the free ends 5 of the set of levers 4 in one direction or in another about the average position thereof thanks to a transverse control ring 6, connected to the free ends 5. The constitution of the control ring 6 and the connection with the free ends 5 of the arms of the levers 4 is an aim of the present disclosure.

Figure 2:
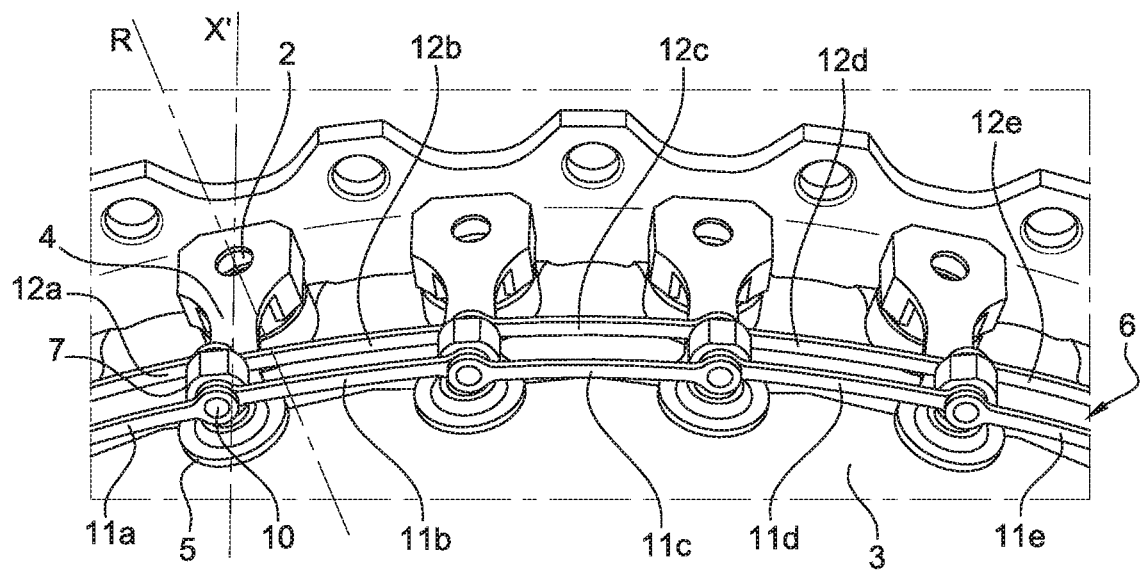
FIG. 2 shows a detail in perspective of the device of FIG. 1.
Figure 3:
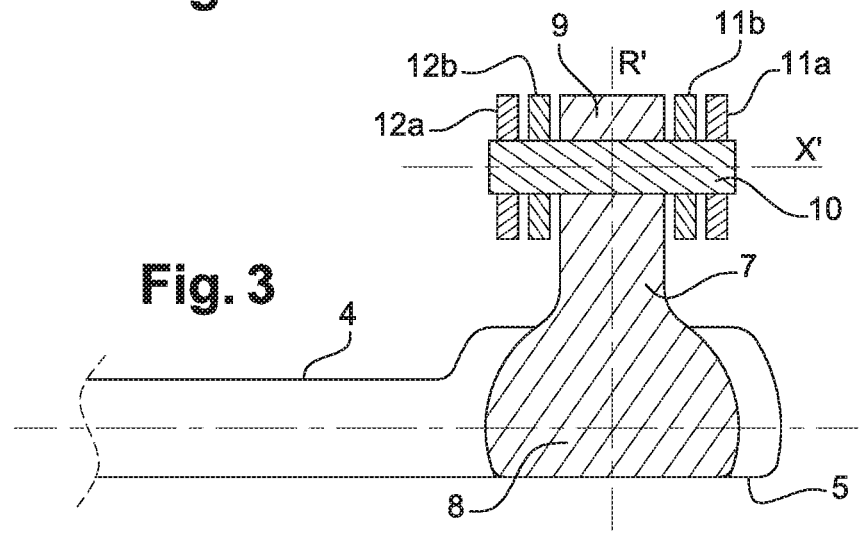
FIG. 3 shows an axial schematic cross-section of a device according to the present disclosure at the level of the connection between the control ring and a lever connected to a vane.

In reference to FIGS. 2 and 3, the free end 5 of each lever arm 4 is connected by a ball-joint connection to a connecting part 7 forming a finger emerging from the lever arm 4 radially outwards, so as to move away from the casing 3. For this, the free end 5 of the lever arm 4 here comprises a cavity that engages with a spherical head 8 of the connecting part 7. The connecting part 7 can thus rotate mainly about an axis R', substantially parallel to the radial direction R of the pivot 2 of the vane, and also to be inclined in the perpendicular directions, while still having a fixed point on the free end 5.

An end 9 of the connecting part 7 opposite to a spherical head 8 supports a pivot 10 of which the axis X' is positioned so as to be substantially parallel to the axial direction X. This pivot 10 is arranged to make it possible for a pivot connection about the axis X' between the connection part 7 and elements of the control ring 6 mounted on the pivot 10, on either side of the connecting part 7. This pivot connection can be associated with a ball-joint connection. In this latter case, a bead (not shown) passed through by the pivot 10 or integral with this pivot could be ball-joint mounted in a spherical cavity of the end 9.

As mentioned hereinabove with respect to the end 9, the spherical head 8 can be replaced with a bead (not shown) passed through by the connecting part 7 and ball-joint mounted in a spherical cavity of the free end 5 or in a ring added in an orifice of this free end 5.

The control ring 6 comprises a series of links, link 11a-12a, link 11b-12b, link 11c-12c, etc., which are mounted in a pivot connection about the pivots 10 of the connecting parts 7 on two successive levers 4. The links 11a-12a, 11b-12b, 11c-12c, etc. therefore all substantially have the same length and comprise, at each end, an eye (i.e. a hole) wherein is inserted the pivot 10 supported by a connecting part 7.

In the example shown, the control ring 6 comprises a first circumferential series of links 11a-11b-11c—etc. . . . , mounted on a first side with respect to the connecting parts 7 along the axial direction X, and a second circumferential series of links 12a-12b-12c—etc . . . , mounted on the opposite side along the axial direction X. For each circumferential series, the links are mounted alternating either against the connecting part 7 or in a way separated from it by the adjacent links. Here, alternating between the close and separated links of the connecting part 7 is the same for circumferential series, 11a-11b-11c . . . and 12a-12b-12c . . .

The articulations by the pivots 10 about a single axis X' parallel to the axis X on the connecting parts 7 on the free end 5 of each lever arm 4 forcing all of the links, 11a-11b-11c . . . and 12a-12b-12c . . . , to form a control ring 6 of which the main degree of freedom is a rotation about the axis X of the casing 3.

Placing the control ring 6 into rotational movement about the axis X drives the connecting parts 7 in the same rotational movement about the axis X. The connecting parts 7 drive in turn the free end 5 of each lever arm 4 in the circumferential movement. The ball-joint connection then makes it possible for the connecting part 7 and the arm of the lever 4 to pivot with respect to one another along the radial axis R' on each free end 5, in order to render the movement of the assembly possible. By applying a suitable tangential force at a location of the chain of links, 11a-11b-11c . . . and 12a-12b-12c . . . , forming the control ring 6, a variation in the pitch for the annular row of vanes is thus obtained.

During this movement of the assembly, the free ends 5 of the lever arms 4 are displaced slightly axially. The rotation of the control ring 6 is therefore accompanied for the latter by a small axial translation movement.

The presence of the pivot connections between the links, 11a-11b-11c . . . and 12a-12b-12c . . . , and the connecting parts 7, as well as the presence of a ball-joint connection instead of a single pivot connection between the connecting part 7 and the free end 5 of each arm of the lever 4, make it possible to not render the system hyperstatic. Indeed, beyond the considerations for mounting, the free ends 5 are not moved exactly on a cylinder of circular section when the levers 4 rotate about pivots 2 of the vanes. Moreover, during operation of the turbine engine the part can have deformations that are slightly different, in particular due to the thermal dilatations. It is therefore useful to give the system the degrees of freedom that allow it to absorb these deformations.

In some embodiments, a tangential force is applied to the control ring 6. In reference to FIG. 1, the rod 13 of a cylinder follows a translation movement along a direction substantially parallel to the axial direction X of the casing 3. The movement in translation of the cylinder rod 13 is controlled according to the conditions of use of the turbine engine. A casing 14 mounted on the casing 3 supports a mechanism that comprises a horn 15 of which the free end is connected in a pivot connection to the rod 13 of the cylinder. Moreover, the horn 15 is mounted as a pivot connection in the casing 14 about a substantially radial axis and arranged to drive a turnbuckle 16 in translation along the circumferential direction. The end of the turnbuckle is integral with a clevis 17 which is engaged in one or more links of the control ring 6. Thus, a movement of the rod 13 of the cylinder makes it possible to apply a tangential force at a location of the control ring 6 to move it and modify the pitch of the vanes.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present disclosure may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A control device of an annular row of variable-pitch vanes for an aircraft engine, the control device comprising:
   an annular row of actuating levers which each comprise a first end configured to be attached to a pivot of one of said vanes and a second end configured to be connected to a control ring in rotation about an axis of rotation,
   the control ring comprising at least one annular series of articulated links,
   wherein the second end of each actuating lever carries a pivot connection articulating two successive links of the annular series, each pivot connection extends along a single axis,
   said single axis extending in a direction substantially parallel to said axis of rotation of the control ring,
   wherein the second end of each actuating lever is connected by a ball-joint connection to a finger that carries a pivot defining said single axis,
   and wherein each finger is oriented along a substantially radial direction.

2. The control device according to claim 1, wherein the at least one annular series of articulated links includes:
   a first annular series of links; and
   a second annular series of links wherein the second end of each actuating lever carries the pivot connection articulating two successive links of the second annular series around said single axis.

3. The control device according to claim 2, wherein the links of the first series and of the second series form pairs that connect each actuating lever by being axially separated from one another and by being substantially parallel to one another.

4. The control device according to claim 2, wherein the links of the first series and of the second series form pairs that connect each actuating lever by being substantially parallel to one another.

5. The device according to claim 1, wherein the links are straight.

6. The device according to claim 1, wherein the links are formed by linking rods.

7. The device according to claim 1, wherein the links are located on a circumference with a diameter greater than a diameter of a circumference passing through the second ends of said actuating levers.

8. The control device according to claim 1, wherein each pivot passes through the finger and comprises an end connected to two links extending on either side of the corresponding finger, and an opposite end connected to two links also extending on either side of the finger.

9. An aircraft engine, comprising at least one device according to claim 1.

10. The control device according to claim 1, wherein the second end of each actuating lever carries directly the pivot connection articulating two successive links of the annular series.

11. The control device according to claim 1, wherein the actuating levers and the control ring of the control device are traverse and are disposed about the axis of rotation in a circumferential manner.

12. The control device according to claim 1, wherein the second end of each actuating lever comprises a cavity that engages with a spherical head of the finger.

13. A control device of an annular row of variable-pitch vanes for an aircraft engine, the control device comprising:
   an annular row of actuating levers which each comprise a first end configured to be attached to a pivot of one of said vanes and a second end configured to be connected to a control ring in rotation about an axis of rotation,
   the control ring comprising at least one annular series of articulated links,
   wherein the second end of each actuating lever carries a pivot connection articulating two successive links of the annular series, each pivot connection extends along a single axis,
   said single axis extending in a direction substantially parallel to said axis of rotation of the control ring,
   wherein the second end of each actuating lever is connected by a ball-joint connection to a finger that carries a pivot defining said single axis,
   and wherein each pivot passes through the finger and comprises an end connected to two links extending on either side of the corresponding finger, and an opposite end connected to two links also extending on either side of the finger.

* * * * *